United States Patent
Blanchet et al.

(10) Patent No.: US 10,075,053 B2
(45) Date of Patent: Sep. 11, 2018

(54) ELECTRIC APPARATUS USING EDDY CURRENT GENERATION FOR TRANSMITTING TORQUE BETWEEN TWO ADJACENT ROTORS

(71) Applicant: IDÉNERGIE INC., Montreal (CA)

(72) Inventors: Pierre Blanchet, Montreal (CA); Gilles Trottier, Montreal (CA)

(73) Assignee: IDENERGIE INC., Montreal (CA)

( * ) Notice: Subject to any disclaimer, the term of this patent is extended or adjusted under 35 U.S.C. 154(b) by 880 days.

(21) Appl. No.: 14/372,830

(22) PCT Filed: Jan. 18, 2013

(86) PCT No.: PCT/CA2013/000052
§ 371 (c)(1),
(2) Date: Jul. 17, 2014

(87) PCT Pub. No.: WO2013/106919
PCT Pub. Date: Jul. 25, 2013

(65) Prior Publication Data
US 2014/0346777 A1    Nov. 27, 2014

Related U.S. Application Data

(60) Provisional application No. 61/588,777, filed on Jan. 20, 2012.

(51) Int. Cl.
*H02K 49/04* (2006.01)
*H02K 5/128* (2006.01)
(Continued)

(52) U.S. Cl.
CPC ............ *H02K 49/04* (2013.01); *F03B 13/10* (2013.01); *H02K 5/12* (2013.01); *H02K 5/1285* (2013.01);
(Continued)

(58) Field of Classification Search
CPC ........ F03B 13/10; H02K 21/12; H02K 21/24; H02K 49/04; H02K 49/046; H02K 49/08;
(Continued)

(56) References Cited

U.S. PATENT DOCUMENTS 4,358,243 A * 11/1982 Heath ...................... F03D 5/00
                                                                     416/11
4,495,423 A * 1/1985 Rogers ..................... F01D 7/02
                                                                     290/44
(Continued)

FOREIGN PATENT DOCUMENTS

CN            2891463 Y     4/2007
CN        101252306       8/2008
(Continued)

OTHER PUBLICATIONS

Translation of foreign document CN 2891463 Y (Year: 2007).*
(Continued)

*Primary Examiner* — Alex W Mok
(74) *Attorney, Agent, or Firm* — IP Delta Plus Inc.

(57) ABSTRACT

An electric apparatus comprises a stator having an array of coils positioned within its periphery and a first rotor having an array of magnet pairs positioned within its periphery. The first rotor has one face adjacent to the stator. A second rotor made of conductive material is positioned adjacent to another face of the first rotor. A coupling mechanism may be connected to the second rotor. The electric apparatus may be connected to an electric power source and act as a motor for driving a mechanical load attached to the coupling mechanism. The electric apparatus may alternatively be connected to an electric load, a turbine being attached to the coupling mechanism for generating electric power. An enclosure may protect components of the electric apparatus against external elements, for example to allow underwater operation.

16 Claims, 18 Drawing Sheets

(51) Int. Cl.
  *H02K 49/08* (2006.01)
  *H02K 7/116* (2006.01)
  *H02K 7/00* (2006.01)
  *H02K 49/10* (2006.01)
  *F03B 13/10* (2006.01)
  *H02K 5/12* (2006.01)
  *H02K 7/11* (2006.01)
  *H02K 7/18* (2006.01)
  *H02K 21/12* (2006.01)
  *H02K 21/24* (2006.01)

(52) U.S. Cl.
  CPC ............ *H02K 7/003* (2013.01); *H02K 7/11* (2013.01); *H02K 7/116* (2013.01); *H02K 7/183* (2013.01); *H02K 49/08* (2013.01); *H02K 49/104* (2013.01); *H02K 21/12* (2013.01); *H02K 21/24* (2013.01); *H02K 49/046* (2013.01); *Y02E 10/725* (2013.01)

(58) Field of Classification Search
  CPC ...... H02K 49/104; H02K 5/12; H02K 5/1285; H02K 7/003; H02K 7/11; H02K 7/116; H02K 7/183; Y02E 10/725
  USPC ..................................... 290/54; 310/105, 83
  See application file for complete search history.

(56) References Cited

U.S. PATENT DOCUMENTS

| | | | | |
|---|---|---|---|---|
| 4,997,414 A * | 3/1991 | Camara | ................ | B63H 5/10 475/330 |
| 5,079,461 A * | 1/1992 | Schluter | ............... | H02K 21/24 310/268 |
| 5,101,128 A * | 3/1992 | Veronesi | ............... | B63H 5/14 290/52 |
| 5,252,875 A * | 10/1993 | Veronesi | ............... | B63H 1/16 310/114 |
| 5,334,899 A * | 8/1994 | Skybyk | ............... | H02K 1/2793 310/114 |
| 5,506,453 A * | 4/1996 | McCombs | ............... | F03D 1/025 290/44 |
| 6,002,193 A * | 12/1999 | Canini | ................ | H02K 3/46 310/101 |
| 8,026,626 B1 | 9/2011 | Meller | | |
| 9,234,498 B2 * | 1/2016 | Prindle | ............... | F03D 1/025 |
| 2002/0149274 A1* | 10/2002 | Pullen | ................. | H02K 1/20 310/58 |
| 2003/0111925 A1* | 6/2003 | Strohm | ............... | H02K 31/02 310/178 |
| 2008/0277940 A1* | 11/2008 | Krouse | ............... | F03B 3/00 290/52 |
| 2009/0045691 A1* | 2/2009 | Ichiyama | ............. | H02K 1/274 310/181 |
| 2010/0019589 A1* | 1/2010 | Saban | ................ | H02K 1/02 310/52 |
| 2010/0187931 A1* | 7/2010 | Palmer, Jr. | ............. | H02K 21/24 310/156.01 |
| 2010/0213885 A1* | 8/2010 | Ichiyama | ............. | H02K 1/276 318/720 |
| 2010/0259050 A1* | 10/2010 | Meller | ............... | F03D 1/025 290/55 |
| 2011/0037333 A1* | 2/2011 | Atallah | ............... | H02K 49/102 310/98 |
| 2011/0084567 A1* | 4/2011 | Ichiyama | ............. | H02K 1/2746 310/181 |
| 2011/0127869 A1* | 6/2011 | Atallah | ............... | H02K 49/06 310/94 |
| 2011/0133469 A1* | 6/2011 | Jansen | ................ | F16H 1/46 290/55 |
| 2011/0198855 A1* | 8/2011 | White | ................ | F03D 1/04 290/55 |
| 2011/0254279 A1* | 10/2011 | Ventzke | ............... | F03D 9/25 290/55 |

FOREIGN PATENT DOCUMENTS

| | | | | |
|---|---|---|---|---|
| GB | 1220145 A | | 1/1971 | |
| JP | 07174033 A | * | 7/1995 | ............ H02K 16/02 |
| WO | 9847215 A1 | | 10/1998 | |
| WO | 2011061491 A2 | | 5/2011 | |
| WO | 2011144895 A2 | | 11/2011 | |
| WO | WO 2011160833 A1 | * | 12/2011 | ............... F01N 5/04 |

OTHER PUBLICATIONS

Translation of foreign document CN 101252306 A (Year: 2008).*
CN 2891463; Qihua; English language abstract.
CN 101252306; Lin; English language abstract.

* cited by examiner

ELECTRIC APPARATUS USING EDDY CURRENT GENERATION FOR TRANSMITTING TORQUE BETWEEN TWO ADJACENT ROTORS

TECHNICAL FIELD

The present disclosure relates to the field of electric motors and generators. More specifically, the present disclosure relates to an electric apparatus using eddy current generation for transmitting torque between two adjacent rotors.

BACKGROUND

With increasing needs for alternative energy sources, turbines harnessing wind and water energy are gaining in popularity. A turbine harnesses mechanical power, characterized by torque and speed of a rotary movement imparted its blades by an air flow or by a water flow. The turbine is coupled with a generator capable of transforming a part of that mechanical power into electric power. Many existing generators use a brushless design. A brushless generator has no commutating electric device connected to its rotor. This simple design, in which a rotary magnetic field is provided by permanent magnets within the rotor, requires limited maintenance.

A specific generator configuration comprises a disk shaped rotor positioned alongside a disk shaped stator. The disk shaped rotor has permanent magnets placed side by side in a ring configuration positioned within its periphery. The stator has multiple coils positioned in a plane of the stator, along its periphery. Upon rotation of the rotor, a magnetic field of its permanent magnets energizes the coils of the stator to produce current by electromagnetic induction. An equivalent motor configuration may be used, in which an electric source energizes the coils of the stator, creating an electromagnetic field that induces a rotating force on the rotor.

A disk shaped brushless motor/generator therefore has a generally flat shape, having a radius larger than its depth. It may be used in various applications in the field of renewable energy where it may for example accommodate a turbine shape. As an example, a vertical axis wind turbine, commonly known as a Darrieus turbine, may benefit from the simplicity of a flat, disk shaped generator, the turbine being directly attached to the disk shaped rotor. This type of generator may provide electric power at low rotational speed, using a direct drive without the need for a gearbox system.

When used underwater, classic electric motors/generators are sealed in order to prevent intrusion of any fluid that could potentially damage the stator and the rotor. A motor/generator is usually coupled to a mechanical working load or driving device, such as a turbine, via a rotating shaft used to transmit mechanical power. A sealing dispositive positioned around the shaft at a point where the shaft protrudes from a chassis of the motor/generator may eventually wear out and allow fluid leakage into the chassis. Maintenance of the sealing dispositive is thus required to prevent any damage to internal components of the motor/generator.

Although some motors/generators may have their internal components designed to withstand the presence of a fluid within their chassis, ferrous particles that may be present inside the fluid may be magnetically attracted in the chassis and may accumulate on internal walls of the chassis. This may damage the motors/generators, especially in the case of rotors having permanent magnets. As an example, a hydrokinetic turbine having its electric generator submerged into water and having a shaft directly coupled with a turbine may, due to the ongoing rotation of the shaft, wear out a sealing dispositive, creating an opening allowing water to reach inside the chassis. Intrusion of water will sooner or later occur, without ongoing proper maintenance.

Therefore, there is a need for transmitting power, torque or force between a rotating shaft and a motor or a generator while preventing any fluid leakage into a motor or generator chassis.

SUMMARY

According to the present disclosure, there is provided an electric apparatus comprising a stator and two rotors. The stator comprises an array of coils positioned within its periphery. A first rotor comprises an array of magnet pairs positioned within its periphery and has a first face adjacent to a face of the stator. A second rotor comprises conductive material and is adjacent to a second face of the first rotor. A rotational speed difference between the first and second rotors generates eddy currents in the second rotor so that a torque is transmitted between the first and second rotors.

According to the present disclosure, there is also provided a submersible electric generator comprising a stator, an electric output, two rotors, a coupling mechanism and a turbine. The stator comprises an array of coils positioned within its periphery. The electric output is connected to the array of coils. A first rotor comprises an array of magnet pairs positioned within its periphery and has a first face adjacent to a face of the stator. A second rotor comprises conductive material and is adjacent to a second face of the first rotor. The coupling mechanism is connected to the second rotor. The turbine drives the coupling mechanism. Rotation of the turbine creates a rotational speed difference between the first and second rotors. This rotational speed difference generates eddy currents in the second rotor, creating a torque transmitted from the second rotor to the first rotor. A rotation of the first rotor in turn generates a current in the array of coils for supplying the current to an electric load.

BRIEF DESCRIPTION OF THE DRAWINGS

Embodiments of the disclosure will be described by way of example only with reference to the accompanying drawings, in which:

FIG. 1a is an illustration of a conventional magnet rotor disk;

FIG. 1b is an illustration of a planar coil stator disk for use with the magnet rotor disk of FIG. 1a;

FIG. 2 is an illustration of magnetic field lines flowing on an unused surface of the magnet rotor disk of FIG. 1a;

FIG. 3b is a perspective, exploded view of the electric apparatus of FIG. 3a;

FIG. 6b is a detailed, perspective view of the application example of FIG. 6a;

FIG. 6c is a detailed, side elevation view of the application example of FIG. 6a;

FIGS. 11a to 11e schematically show variants of the electric apparatus of FIG. 3a;

DETAILED DESCRIPTION

Figures 1A, 1B:
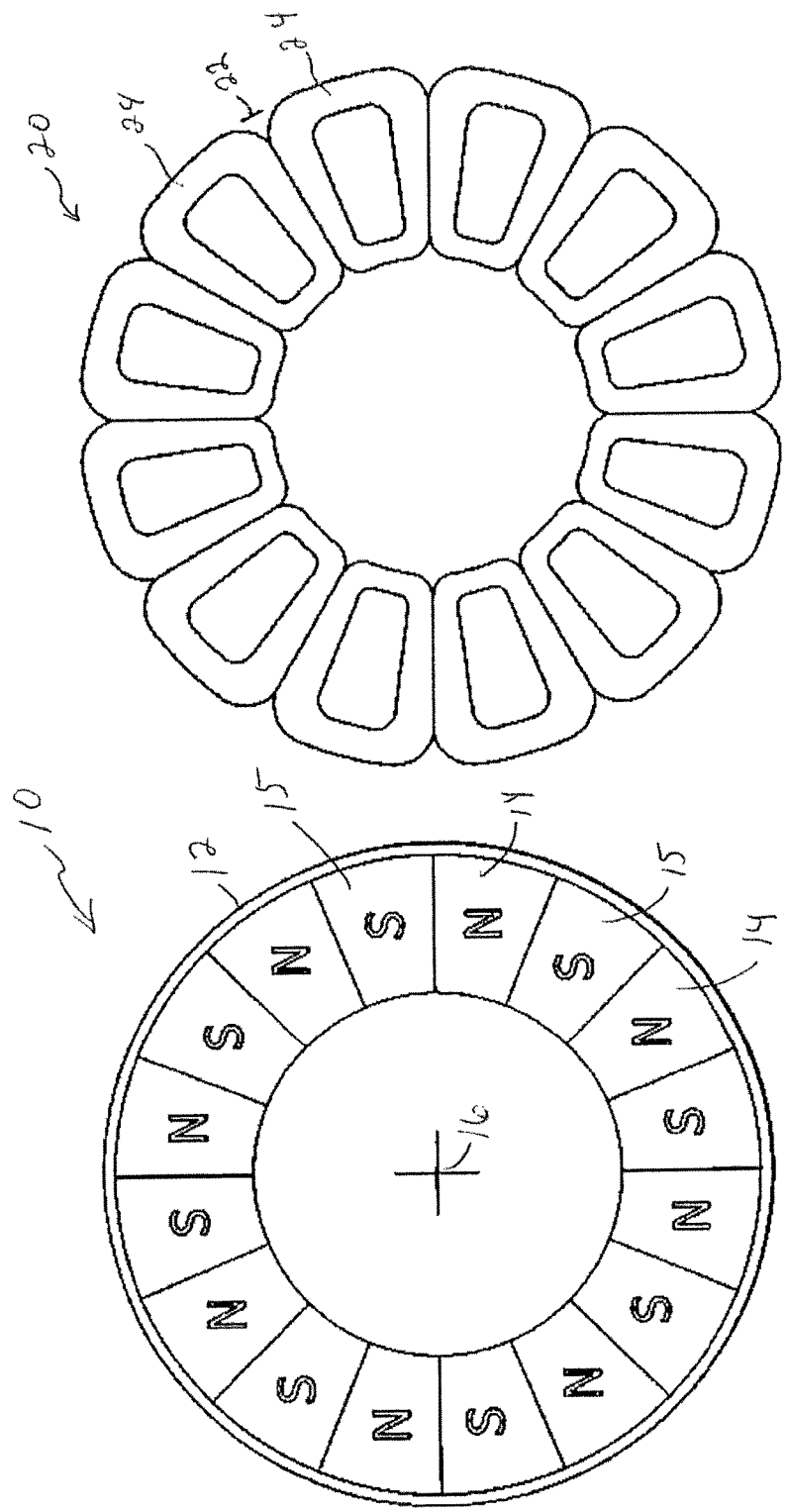

The foregoing and other features will become more apparent upon reading of the following non-restrictive description of illustrative embodiments thereof, given by way of example only with reference to the accompanying drawings.

Various aspects of the present disclosure generally address one or more of the problems related to preventing any fluid leakage into a motor or generator chassis.

The following terminology is used throughout the present disclosure:

Eddy current: current induced in a conductor when exposed to a changing magnetic field; also called Foucault current.

Planar: a shape of a three-dimensional device having two dimensions being significantly greater than a third dimension.

Adjacent: side by side in close proximity.

Array of coils: multiple loops of electric wires placed within a perimeter of a disk.

Fixedly connected: securely fastened.

Sealed: tightly closed for preventing passage of a fluid.

Generator: an apparatus that converts mechanical energy into electric energy.

Turbine: device intended for rotating under a flow or water or under a flow of air.

Electric load: device or circuit for consuming electric power.

Motor: an apparatus that converts electric energy into mechanical energy.

Current source: device or circuit for providing electric power.

Mechanical load: device or equipment to which power is provided in the form of a force or a torque.

Electric input/output: conductive port for receiving or for transmitting electrical power.

Common axis: a straight line shared by a plurality of elements, around which at least some of the elements may rotate.

Array of magnet pairs: an even-numbered of magnets placed within a perimeter of a disk.

Submersible: capable of operating under water.

In an electric assembly, a rotor and a stator operate in tandem to convert a changing magnetic field into current, or to convert a current into an electromagnetic force. In a specific disk shaped electric assembly, a first face of a rotor having an array of magnets positioned within its periphery creates an axial magnetic flux that interacts with an array of coils positioned within a periphery of an adjacent stator. Magnetic fields present on a second face of the rotor are not employed by conventional electric assemblies. A rotating shaft or other coupling mechanism may be attached to the second face of the rotor for transmitting a mechanical force or torque between the rotor and a mechanical device. Torque or force may be transmitted from the rotor to the mechanical device when the disk shaped electric assembly is used as a motor or from the mechanical device to the rotor when the disk shaped electric assembly is used as a generator.

In an embodiment, the present disclosure introduces an electric apparatus using magnetic fields present on a face of a first rotor of a disk shaped electric, opposite from a stator, to induce rotation of a second rotor positioned alongside the first rotor. The second rotor is generally shaped as a planar disk and is made of an electric conductive material, for example copper or aluminum. The electric apparatus forms a stacked configuration including, in this order, a stator, a first rotor and a second rotor adjacent and proximal to the first rotor, the stator and the two rotors being positioned on a common axis. The second rotor may be connected to a mechanical load or to a mechanical source of force or torque. The first and second rotors are not mechanically connected and are separated by a modest gap. Consequently, the first and second rotors may have distinct rotational speeds. Because the first rotor comprises an array of magnets, variations of angular positions between the two rotors expose the second rotor to a variable magnetic field, which generates loops of eddy currents in the second rotor. Eddy current loops generated in the second rotor in turn generate their own magnetic field, opposing the variable magnetic field of the second rotor, and creating a torque that tends to minimize a rotational speed difference between the two rotors. This torque may be used create motor and generator applications from various embodiments of the electric apparatus.

The electric apparatus may thus be used as a motor or as a generator. When used as a motor, the array of coils of the stator may be electrically connected to a current source via an external electric connector. Energizing the arrays of coils of the stator induces rotation of the first rotor, creating a variable magnetic field that, in turn, induces eddy currents in the second rotor. These eddy currents are counter reacted, or compensated, at least in part, by a torque transmitted from the first rotor to the second rotor, the torque inducing a rotation of the second rotor. The second rotor may then transfer this torque, via a coupling mechanism attached thereto, for example via a rotating shaft, to a mechanical load.

The electric apparatus may alternatively be used as an electric generator. A turbine, driven by a flow of air or by a flow of water, may drive a coupling mechanism attached to the second rotor. Because of the proximity between the first and second rotors and because of the magnetic fields present in the first rotor, rotation of the second rotor generates eddy current loops in the second rotor, which are at least in part compensated by a torque that induces rotation of the first rotor. Rotation of the first rotor creates a variable magnetic field that induces more currents in the array of coils in the stator. The array of coils of the stator may be electrically connected via the external electric connector to an electrical load that consumes power from this generator.

Since no mechanical contact is required between the first and second rotors, it is possible to solve the sealing problem of conventional motors and generators. The stator and the first rotor may located in an enclosure, which may be sealed, thereby reducing or eliminating possibilities of fluid leakage reaching the stator and the first rotor while significantly reducing maintenance requirements of the apparatus. An isolating plate made of non-conductive material may be placed within the gap between the first and second rotors. When used in a submerged environment, coupled with a hydrokinetic turbine, the electric apparatus may form a submersible, hydro proof generator.

Referring now to the drawings, FIG. 1a is an illustration of a conventional magnet rotor disk. FIG. 1a, as well as other Figures of the present disclosure, is not to scale. A rotor 10, generally shaped as a planar disk, has a periphery 12 within which are placed magnets, which may for example be permanent magnets. The magnets are arranged in pairs of magnets 14 and 15 having opposed polarities. A plurality of magnet pairs forms a ring within the periphery 12 of the rotor 10. The shape, size and number of magnets may vary from that shown on FIG. 1a. More particularly, the magnets may extend over a small or large part of a radius of the rotor 10, between a central axis 16 and the periphery 12 of the rotor 10. The magnets are oriented so that their magnetic fields extend through a depth of the rotor 10. When rotating around its central axis 16, the rotor 10 creates a rotating magnetic field. FIG. 1b is an illustration of a planar coil stator disk for use with the magnet rotor disk of FIG. 1a. A stator 20, also generally shaped as a planar disk, comprises a set of coils 24 made out of a conducting wire, the set of coils 24 forming an array within a periphery 22 of the stator 20. As in the case of the magnets of the rotor 10, the shape, size and number of coils may vary from that shown on FIG. 1b. For example, in single-phase applications, there may be four (4) magnets on the rotor 10 for each three (3) or six (6) coils on the stator 20. Other combinations may also be envisioned. When the stator 20 is positioned alongside the rotor 10, the coils 24 are intended to interact with the rotating magnetic field, which induces currents in the coils 24. A combination of the stator 20 with the rotor 10 thus forms an axial flux magnet assembly in which the rotor 10 becomes a brushless rotor. Connecting a coupling mechanism (not shown), for example a rotating shaft (not shown), to the rotor 10, the combination may serve to transform mechanical power into electric power or vice-versa. In a motor application, the stator 20 may also have its coils energized with current from an external source to create a movement in the rotor 10, in which torque and speed may be used to drive a mechanical load. In a generator application, rotation of the rotor 10 driven for example by a turbine induces currents in the coils 24, which may be connected to an electric load. Interconnection of the coils 24 may be arranged to allow generation of different configurations of phased current, for example three phased current. The coils 24 may be connected in series, in parallel, in a star configuration, or in any combination.

Various types of magnets may be used in the rotor 10, for example ferromagnetic magnets, rare earth metal magnets, ceramic magnets, ferrite magnets, alnico magnets, samarium magnets, neodyme magnets, composite magnets or electromagnets. It is also possible to use combinations of these types of magnets within a same rotor 10.

Figure 2:
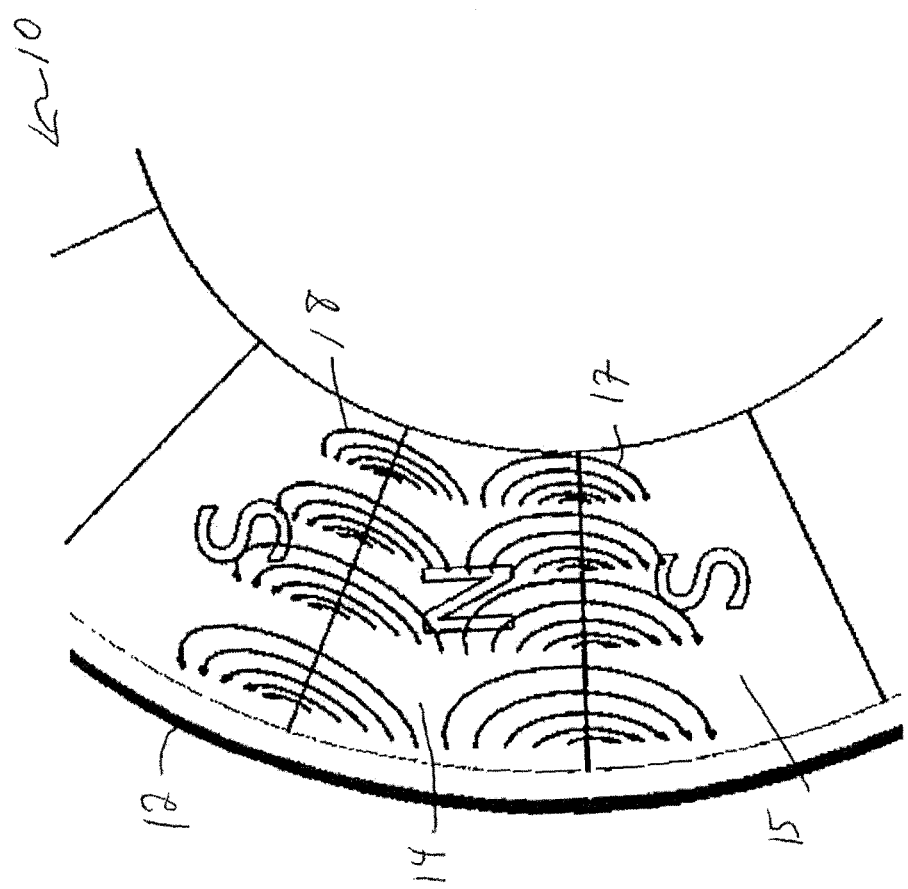

When combining the rotor 10 with the stator 20 as described hereinabove, one face of the rotor 10 interacts with the stator 20 via magnetic fields present on that face of the rotor 10. Magnetic fields present on another, external face, which may be connected to a rotating shaft, have no specific usage. FIG. 2 is an illustration of unused magnetic field lines flowing on an external surface of the magnet rotor disk of FIG. 1a. Lines 17 and 18 illustrate unused magnetic fields of conventional eddy-current assemblies. The present disclosure introduces a structure for using these magnetic fields to create a magnetic drive using eddy current generation.

Figure 3A:
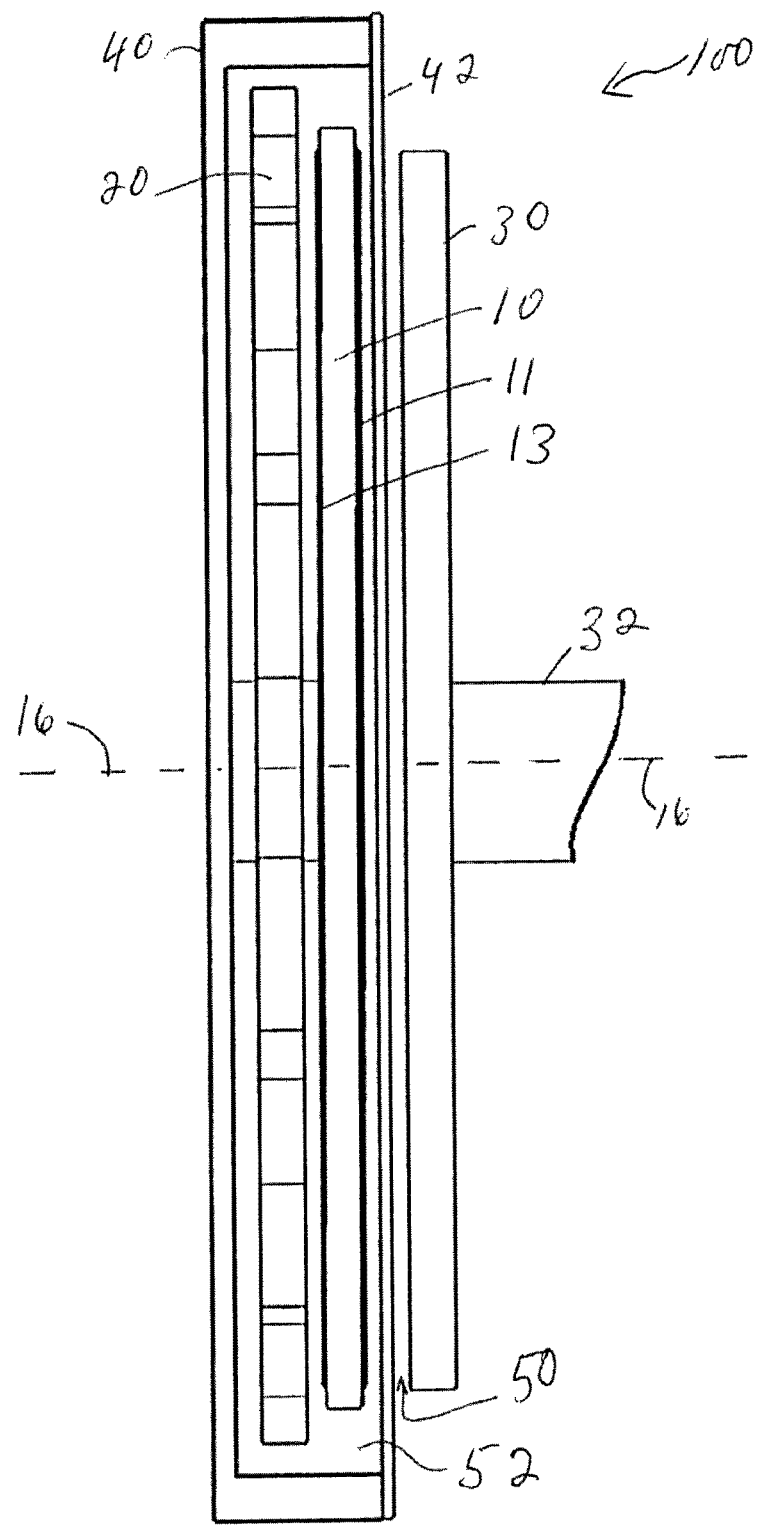
FIG. 3a is a side view of an electric apparatus according to an embodiment.
Figure 3B:
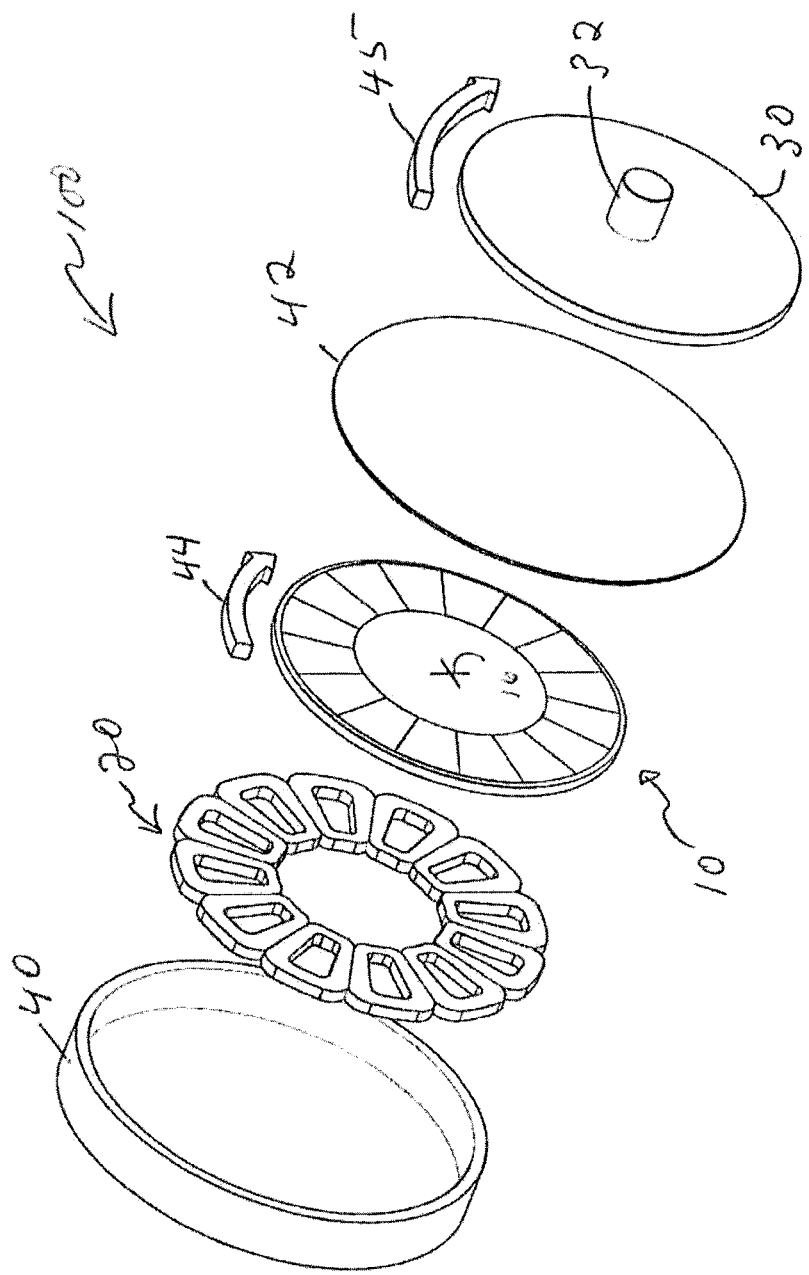

FIG. 3a is an illustration of a side view of an electric apparatus according to an embodiment. FIG. 3b is a perspective, exploded view of the electric apparatus of FIG. 3a. Referring at once to FIGS. 3a and 3b, an electric apparatus 100 comprises the rotor 10 and the stator 20 and further comprises an additional rotor 30 having a planar disk shape and constructed from an electric conductive material, for example copper, aluminum, or like material having sufficient electric conductivity. Though the rotor 30 as illustrated comprises a unitary disk of electric conductive material, a variant may comprise a plurality of thin conductive material disks joined by inter-layers of an isolating material. A rotating shaft 32 is fixedly connected to the rotor 30. The rotor 30 is adjacent to a face 11 of the rotor 10 that is opposite from another face 13 of the rotor 10, the face 13 being adjacent to the stator 20. The rotor 10, the stator 20, the rotor 30 and the rotating shaft 32 share a common central axis 16. Optionally, the rotor 10 and the stator 20 may be contained within an enclosure 40 having a cover 42 for isolating the rotor 10 and the stator 20 from external contaminants. The cover 42 may hermetically seal the enclosure 40. The enclosure 40 and the cover 42 are typically made of non-conductive material, for example polyvinyl chloride (PVC), in order to not interfere with the magnetic fields present in the stator 20 and in the rotors 10 and 30. Whether the enclosure 40 and cover 42 are present or not, the rotor 10 and the rotor 30 are separated by a gap 50, ensuring that the rotor 10 and the rotor 30 are mechanically decoupled. Air, water or any other fluid may be present in the gap 50. For some applications, for example for underwater applications, air 52 or any other gas may be present within the enclosure 40 while air, water or fluid may be present within the gap 50. Those of ordinary skill in the art will be able to select a size of the gap 50, or an overall distance between the rotor 10 and the rotor 30, and a size, shape and number of magnets 14, 15 and coils 24 so that the rotor 30 lies within a dense magnetic field of the magnets 14 and 15 of the rotor 10. They will also appreciate that the enclosure 40 and cover 42 may prevent any liquid, dust, pollutants or other contaminants from reaching the rotor 10 and the stator 20. Uses of the enclosure 40 and cover 42 to hermetically seal the rotor 10 and the stator 20 are therefore not limited to underwater applications.

A variant of the electric apparatus 100 may comprise a slightly different enclosure (not shown) containing the rotor 10, the stator 20 and the rotor 30, adding a sealing joint (not shown) positioned on the sealed enclosure at a point where the rotating shaft 32 protrudes from the sealed enclosure. In this variant, because the sealing joint may eventually leak, a barrier (not shown), for example a water barrier that does not need to be entirely watertight, may be positioned between the first and second planar rotors 10 and 30, within the gap 50. In applications where it is desired to protect the electric apparatus 100 from dust or pollutants, a less than perfectly tight enclosure may be sufficient. Those of ordinary skill in the art having the benefit of the present disclosure will be able to readily develop various manners of protecting internal components of the electric apparatus 100 from water or from other foreign substances.

Figure 4:
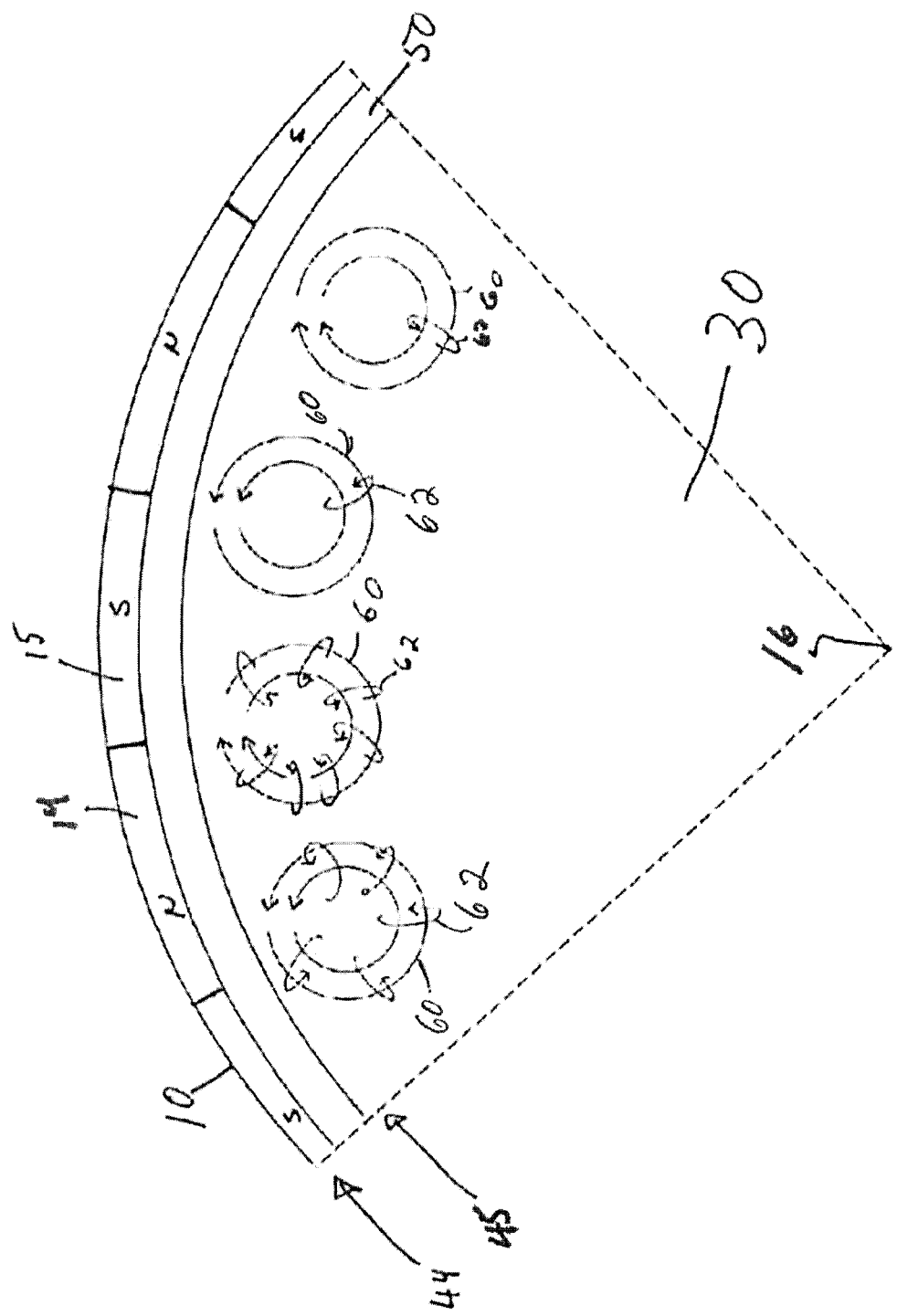
FIG. 4 is a schematic representation of magnetic fields and induced eddy current loops.

FIG. 4 is a schematic representation of magnetic fields and induced eddy current loops. FIG. 4 is not to scale and does not represent an actual number of magnets on the rotor 10, or relative sizes of the gap 50 and of the rotors 10 and 30. The rotor 10 rotates at a speed 44, in a direction as shown by arrow 44. The rotor 30 rotates at a speed 45, in a direction as shown by arrow 45. Magnetic fields from the pairs of magnets 14 and 15 generate eddy current loops 60 on a surface of the rotor 30. The eddy current loops 60 in turn create their own magnetic fields 62 that interact with the magnetic fields from the pairs of magnets 14 and 15 and reduce a speed difference between the rotor 30 and the rotor 10. Inasmuch as the speeds 44 and 45 are distinct, positions of the eddy current loops 60 move around the surface of the rotor 30, along the direction of arrow 45. A vector sum of magnetic fields from the rotor 10, identified with lines 17 and 18 of FIG. 2, and of the magnetic fields 62 create a torque transmitted between the rotors 10 and 30. Torque is transmitted from one of the rotors, rotating at a higher speed, to the other one of the rotors.

Figure 5:
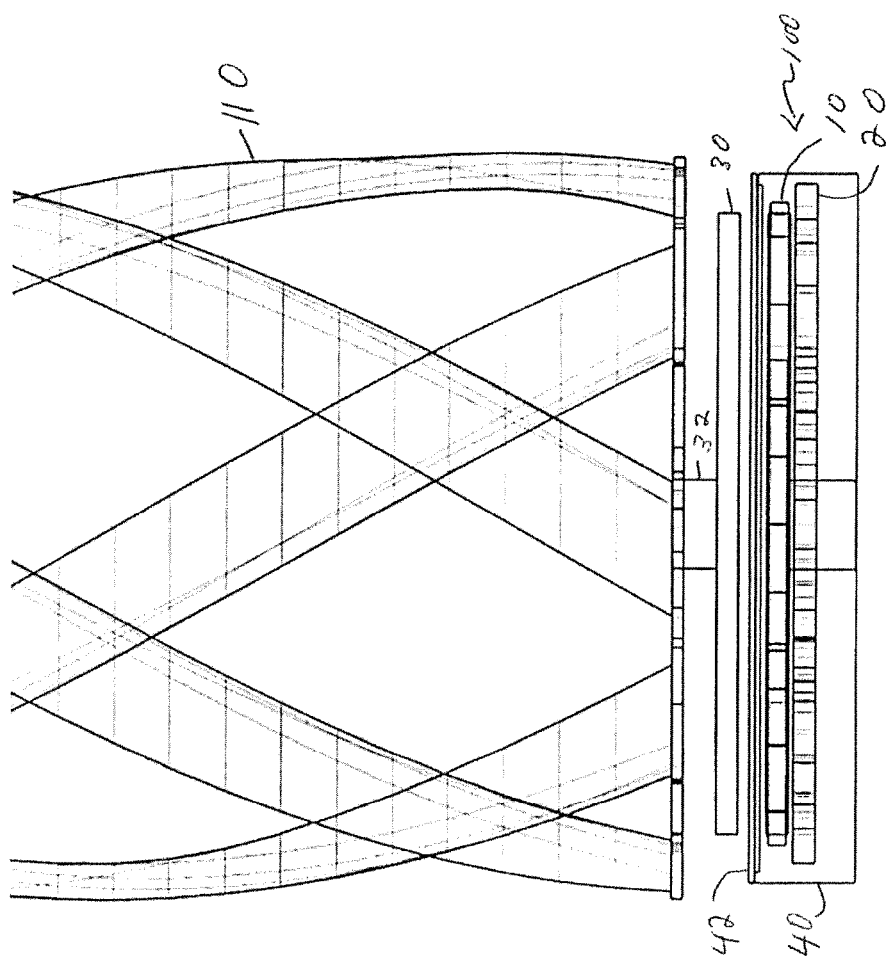
FIG. 5 is an illustration of an application example of the electric apparatus of FIG. 3a, shown coupled to a vertical axis Darrieus turbine.
Figure 6B:
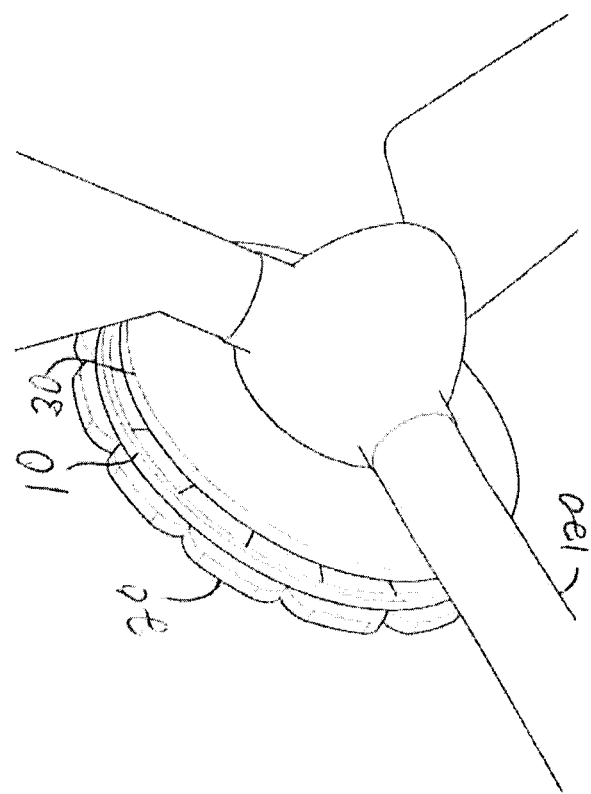
Figure 6A:
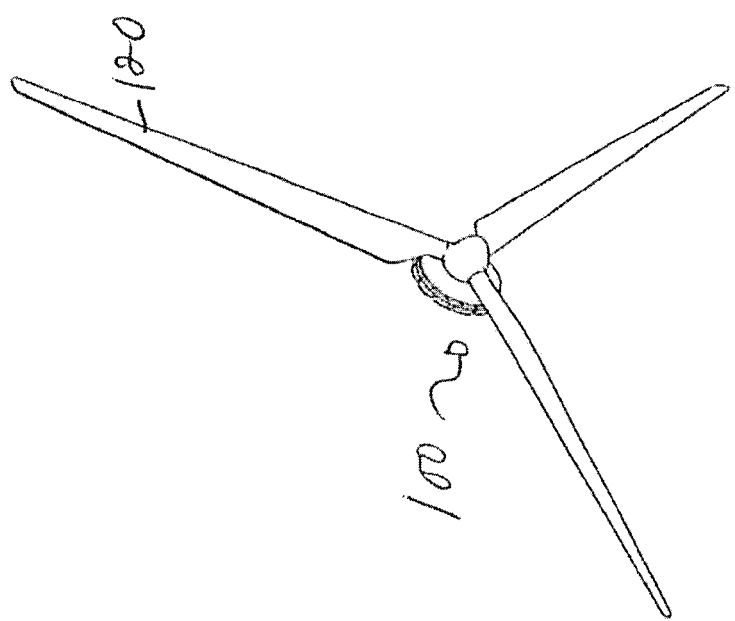
FIG. 6a is another illustration of an application example of the electric apparatus of FIG. 3a, shown coupled to a horizontal axis turbine.
Figure 6C:
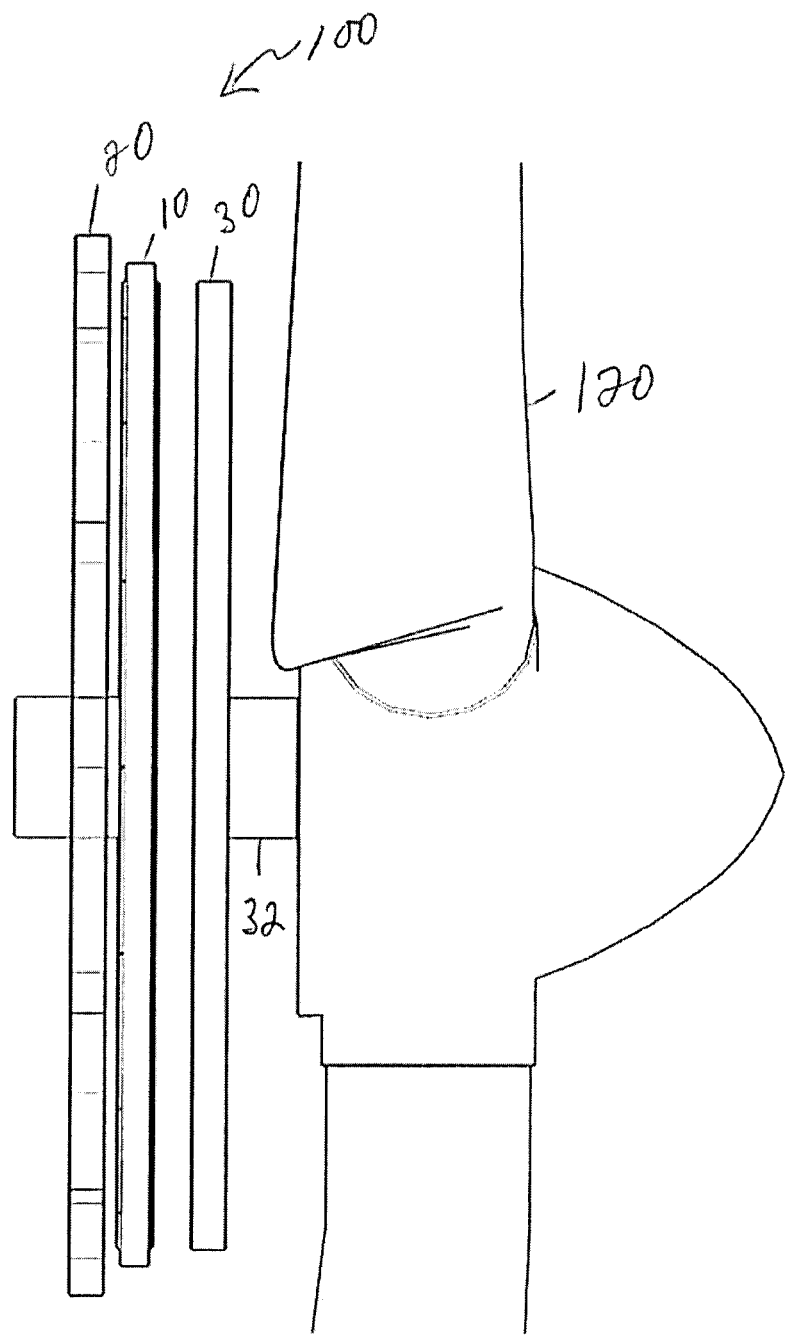

FIG. 5 is an illustration of an application example of the electric apparatus of FIG. 3a, shown coupled to a vertical axis Darrieus turbine. The electric apparatus 100 is coupled to a vertical axis Darrieus turbine 110 via the rotating shaft 32, forming a generator assembly. The coils 24 of the stator 20 of the generator assembly are arranged to be electrically connected via an electric output, for example an external electric connector (not shown), to an external load (not shown). Although FIG. 5 shows presence of the enclosure 40 and of the cover 42, implementations of a generator assembly using a wind turbine, without hermetically sealing the rotor 10 and the stator 20, may be considered. For example, FIG. 6a is another illustration of an application example of the electric apparatus of FIG. 3a, shown coupled to a horizontal axis turbine. FIG. 6b is a detailed, perspective view of the application example of FIG. 6a. FIG. 6c is a detailed, side elevation view of the application example of FIG. 6a. In the example of FIGS. 6a, 6b and 6c, a horizontal axis turbine 120 is connected to the electric apparatus 100 via the rotating shaft 32, without the enclosure 40 or the cover 42, forming another generator assembly.

Using conventional driving means between a turbine and a conventional generator, a low starting torque present at an output shaft of the turbine could fail to engage the conventional generator because of the generator's inertia and because of an electric load connected thereto. This problem would be particularly prevalent in renewable energy applications, as in the case of hydrokinetic turbines. Any sudden variation of an electric load on the generator or any sudden change in a turbine speed could propagate a mechanical shock through the entire turbine-generator system. Returning to FIGS. 3a and 3b, the rotor 10 and the rotor 30 may rotate at respective speeds 44 and 45. When there is a difference between the speeds 44 and 45, including when one of the rotor 10 or the rotor 30 is motionless or when the two elements rotate in opposite directions, the magnets 14, 15 of the rotor 10 expose the conductive material of the rotor 30 to a magnetic field variation, creating loops of eddy currents inside the rotor 30. These eddy currents in turn induce their own magnetic fields. These magnetic fields tend to reduce the difference between the speeds 44 and 45 by transferring a torque between the rotors. As a result, relative movement between the rotor 10 and the rotor 30 is reduced, as their speeds 44 and 45 are magnetically tied with a slip factor.

In the electric apparatus 100, transmission of a torque between the rotor 10 and the rotor 30 implies some slip between the speeds 44 and 45. Torque is transferred from a faster one of the rotors 10 or 30 to the other one and grows as the speed slip increases. This implies that when the electric apparatus 100 is connected to a turbine, the rotor 30 applies no load to the turbine when rotation of the turbine and of the rotor 30 is barely initiated. Movement of the turbine may thus be initiated with a large slip between the speeds 44 and 45. As the speeds increase, eddy current induction increases proportionally and the turbine transmits more power to the rotor 30 and to the rotor 10, until a maximum torque transfer is reached, compensated by a reasonable slip between the speeds 44 and 45. It may be observed that if there is a sudden change in a turbine speed, for example when the turbine is suddenly slowed down, the rotor 10 acts as a magnetic brake without giving its full additional inertia to the turbine because it is not mechanically coupled to the rotor 30 or to the turbine.

In a variant, it may be possible to decrease or increase the gap 50 between the rotor 30 and the rotor 10. In cases where a speed of the turbine exceeds a maximum power extraction speed point, modifying the gap 50 may be used to alter torque transmission from the turbine to the electric apparatus 100. This allows tailoring an effective power curve or the turbine-generator assembly while accommodating characteristics of the rotor 10 and stator 20 combination, used as a generator, improving its efficiency. Modifying the gap 50 may also apply when the electric apparatus 100 is used in a motor configuration, when it is desired to adapt a speed and a torque of a rotating load to characteristics of the motor.

Figure 7A:
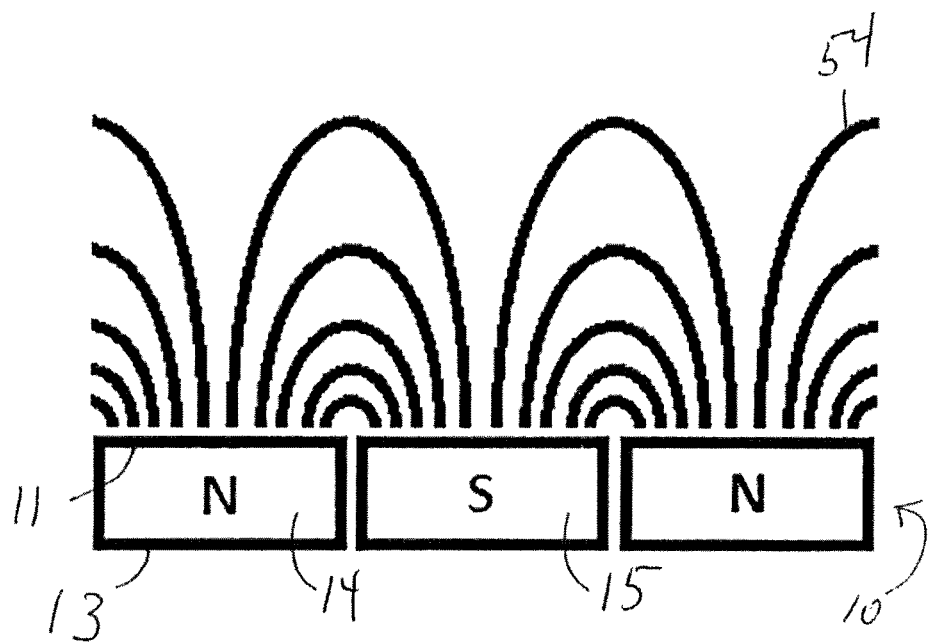
FIG. 7a illustrates magnetic field lines flowing from an exterior surface of a permanent magnet disk from one pole to another.
Figure 7B:
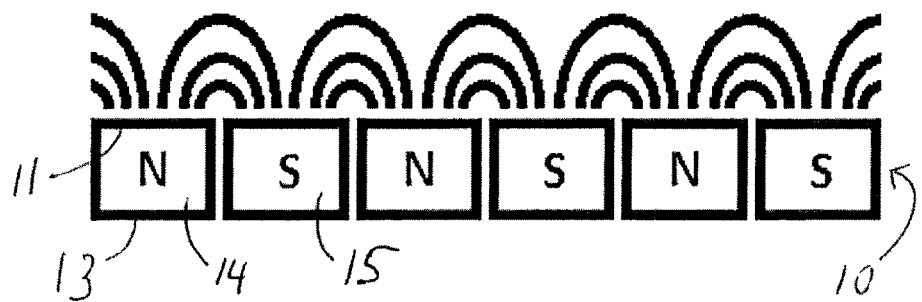
FIG. 7b illustrates magnetic field lines flowing from an exterior surface of a permanent magnet disk from one pole to another, with an increased number of poles and smaller width and decreased length of magnetic field lines.

When the electric apparatus 100 is used as an electric generator, current flowing through the coils 24 of the stator 20 creates its own magnetic field, which tends to oppose the magnetic field from the magnets 14, 15 of the rotor 10. This creates an undesirable feedback torque that tends to partly counter the movement induced by the rotor 30. A variant of the electric apparatus 100 maximizes efficiency by aiming to create electric power from a high voltage and a low current flowing through the coils 24, thus reducing the undesirable feedback torque. FIG. 7a illustrates magnetic field lines flowing from an exterior surface of a permanent magnet disk from one pole to another. Strong magnets 14, 15 and a high number of poles create a high strength and fast alternating magnetic field. Reducing the gap 50 between the rotor 10 and the rotor 30 may increase a density of magnetic flux lines 54 between these elements and optimize a transmitted torque between them. FIG. 7b illustrates magnetic field lines flowing from an exterior surface of a permanent magnet disk from one pole to another, with an increased number of poles and smaller width and decreased length of magnetic field lines. When driving is done using eddy currents, a high number of poles shortens a loop length of the magnetic flux lines 54, thus reducing the transmitted torque. Those of ordinary skill in the art are expected to be able to find, with limited experimentation, a balance between using a magnet pattern for high voltage generation while providing a good driving torque, according to the needs of their intended applications.

Figure 8:
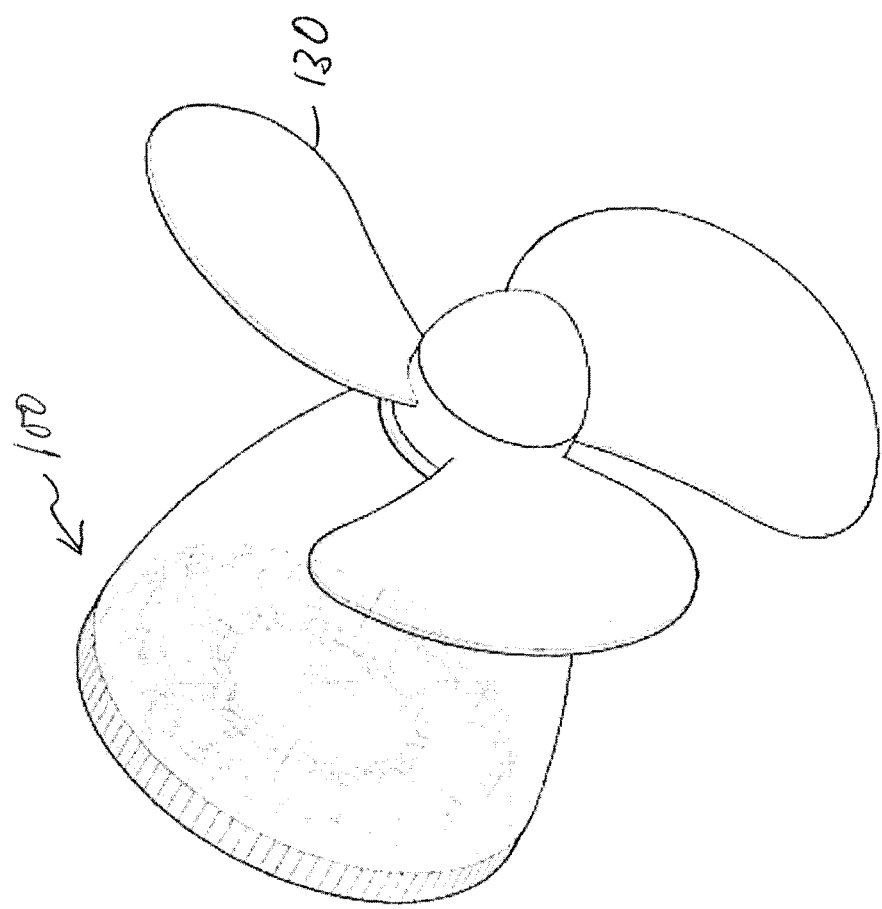
FIG. 8 is a further illustration of an application example of the electric apparatus of FIG. 3a, shown coupled to a fan for maintaining circulation of a fluid in a tank.

FIG. 8 is a further illustration of an application example of the electric apparatus of FIG. 3a, shown coupled to a fan for maintaining circulation of a fluid in a tank. In FIG. 8, the electric apparatus 100 is used as a motor driving a fan 130. The electric apparatus comprises an input (not shown) connected to the array of coils 24 for receiving power from an external source. Intrusion of liquid within the electric apparatus 100 may be avoided when the electric apparatus comprises the enclosure 40 and the cover 42.

Figure 9:
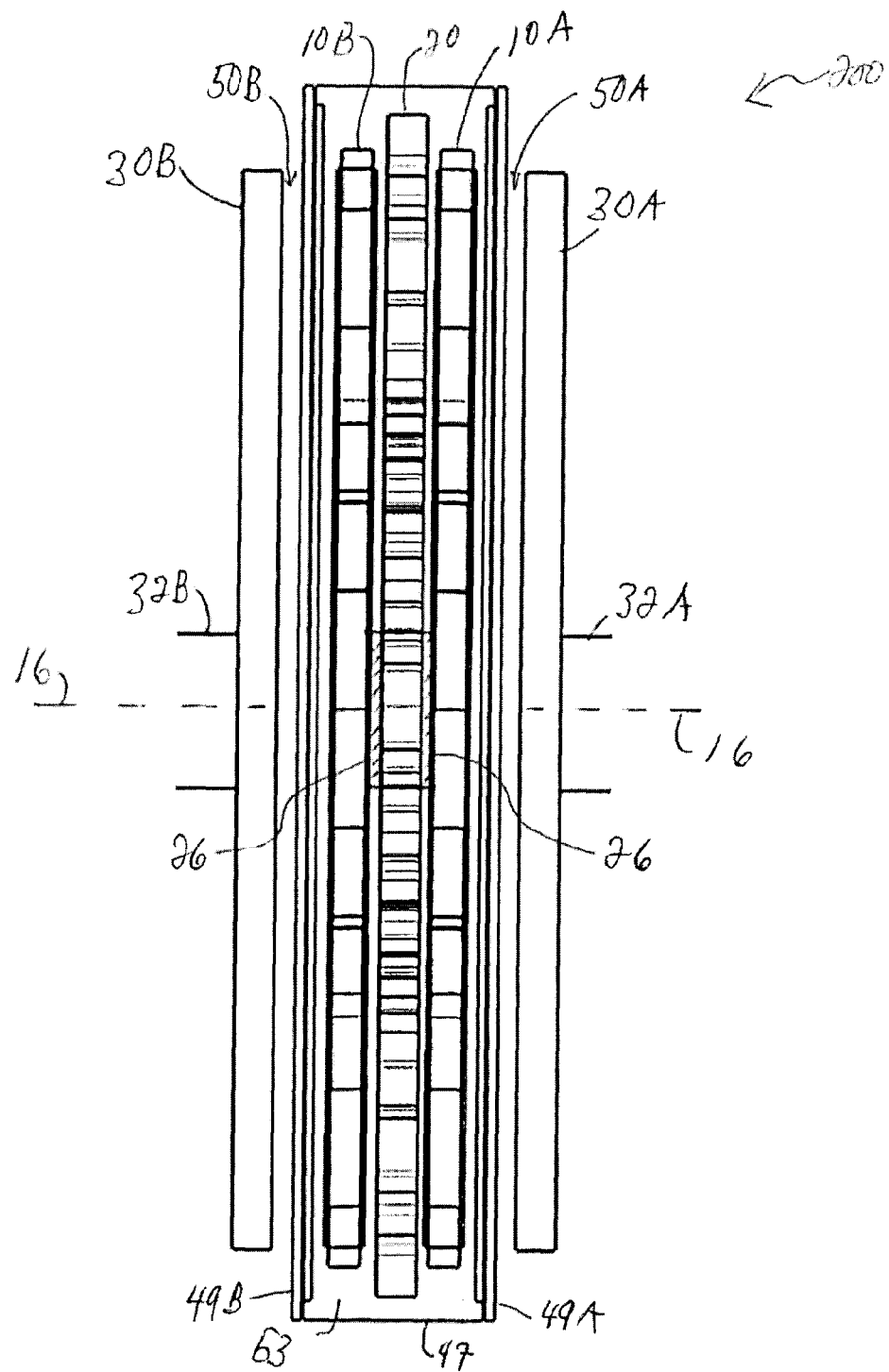
FIG. 9 is a side view of an electric apparatus according to an alternative embodiment.

The stator and rotor arrangement of the preceding Figures may be modified for better control and distribution of magnetic fields. A symmetrical or nearly symmetrical arrangement of the electric apparatus 100 may be envisioned. FIG. 9 is a side view of an electric apparatus according to an alternative embodiment. An electric apparatus 200 comprises the stator 20 and two rotors 10A and 10B, which are similar to the rotor 10 introduced hereinabove. The two rotors 10A and 10B share a common shaft 26 to eliminate any rotational slip between them. The electric apparatus 200 further comprises two additional rotors 30A and 30B having planar disk shapes and made of conductive material, as in the case of the rotor 30. Rotating shafts 32A and 32B are fixedly connected to the rotors 30A and 30B, respectively. The rotors 30A and 30B are adjacent to the rotors 10A and 10B, respectively. The rotors 10A and 10B, the stator 20, the rotors 30A and 30B, and the rotating shafts 32A and 32B share a common central axis 16. Optionally, the rotors 10A and 10B the stator 20 may be contained within a non-conductive enclosure 47 having covers 49A and 49B, for hermetically sealing these elements. Whether the enclosure 47 and covers 49A and 49B are present or not, the rotors 10A and 30A are separated by a gap 50A while the rotors 10B and 30B are separated by a gap 50B, ensuring that the rotors 10A and 10B are mechanically decoupled from the rotors 30A and 30B. Air, water or any other fluid may be present in the gaps 50A and 50B. For some applications, for example for underwater applications, air 53 may be present within the enclosure 47 while air, water or fluid may be present within the gaps 50A and 50B. Those of ordinary skill in the art will be able to select sizes of the gaps 50A and 50B, or overall distances between the rotors 10A and 10B and the rotors 30A and 30B, so that the rotors 30A and 30B lie within dense magnetic fields of the magnets 14 and 15 of the rotors 10A and 10B. As illustrated, the electric apparatus 200 comprise two (2) symmetrical sides. For some applications, it may be possible to modify sizes or shapes of some of the elements of the electric apparatus 200. For example, gaps 50A and 50B may be different, sizes or lengths of the rotating shafts 32A or 32B may be tailored for their respective applications, and the like.

Figure 10:
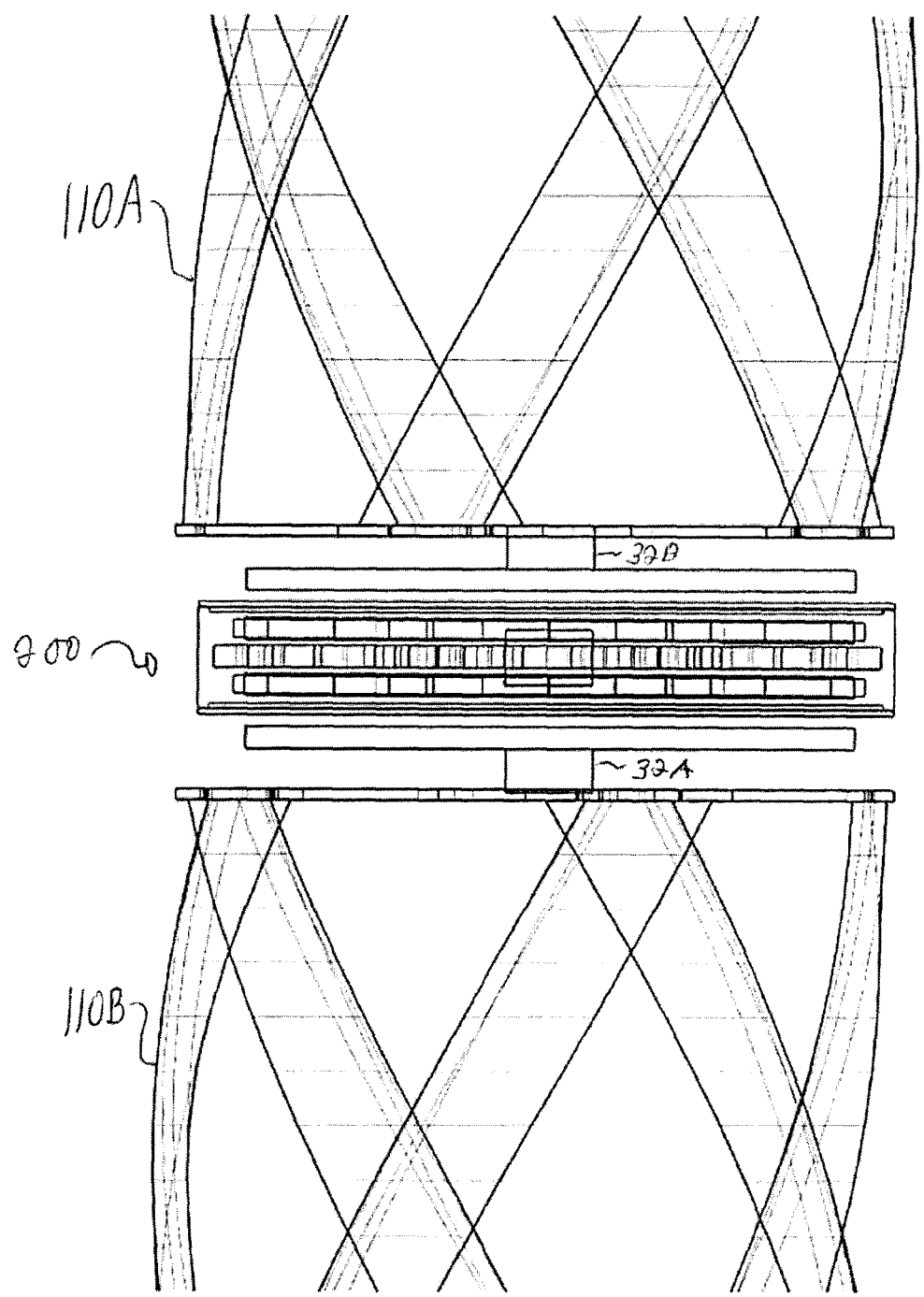
FIG. 10 is an illustration of an application example of the electric apparatus of FIG. 9, shown coupled to two vertical axis Darrieus turbines.
Figure 11:
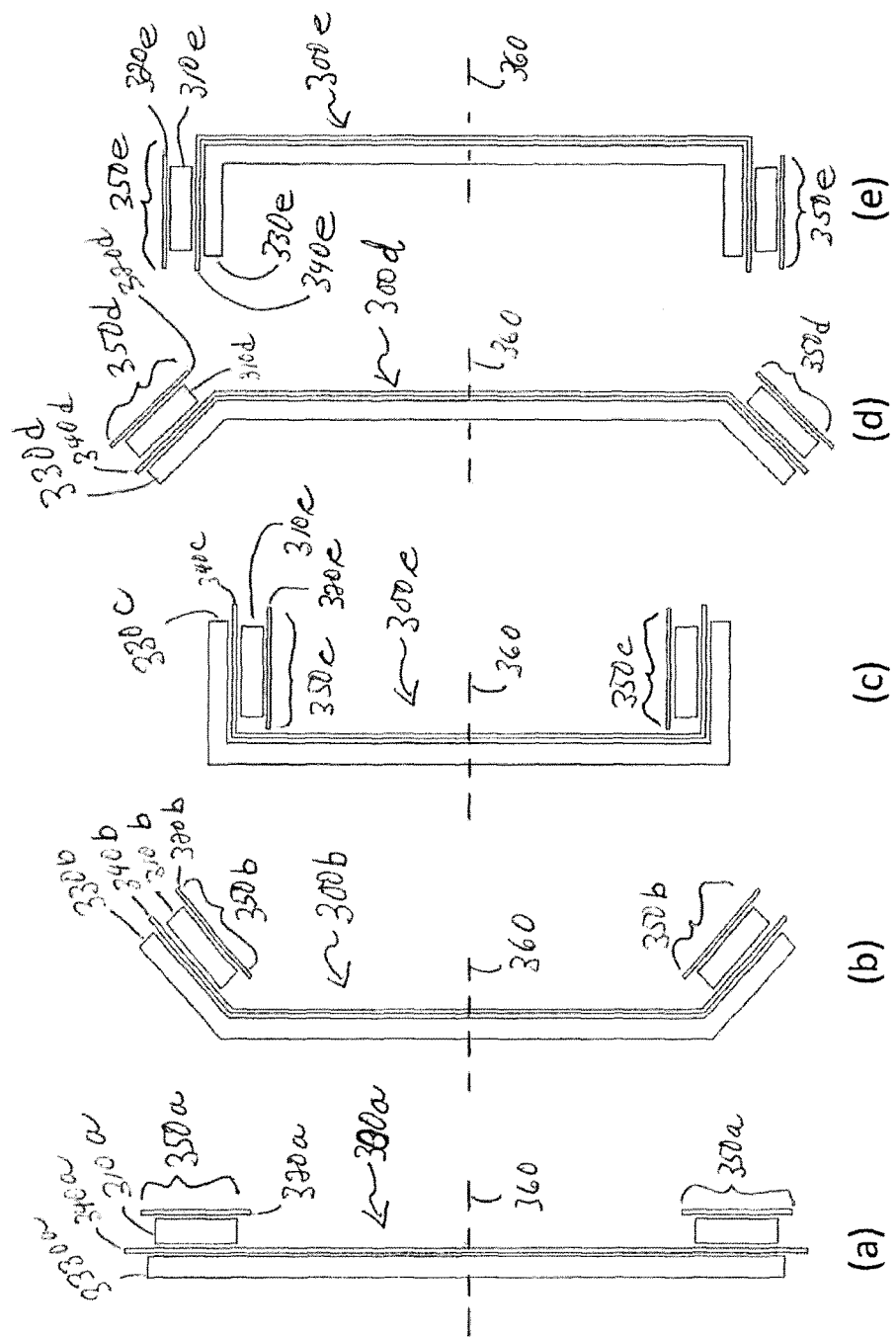
Figure 12:
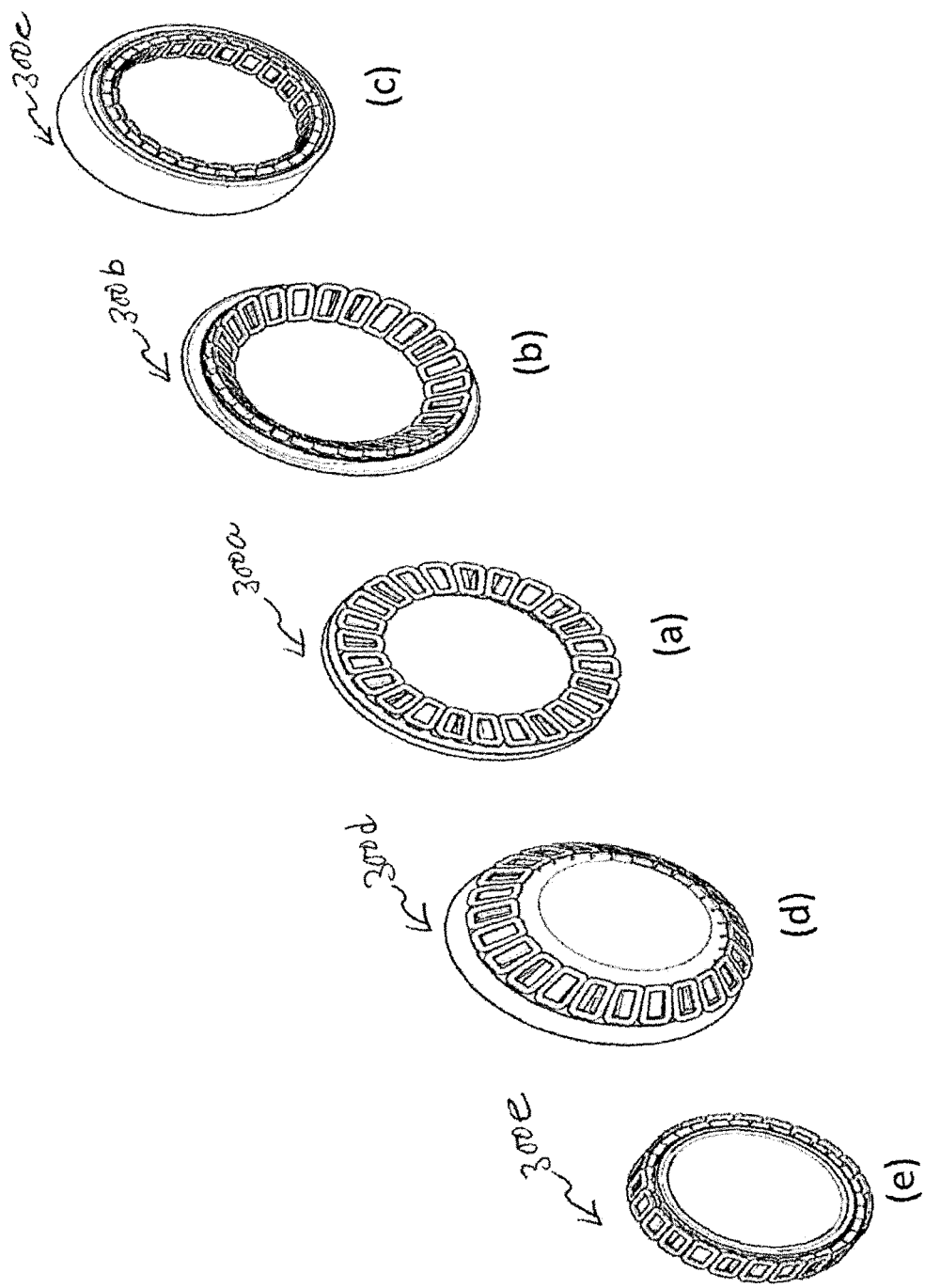
FIGS. 12a to 12e are perspective views of the variants of FIGS. 11a to 11e, respectively.
Figure 13:
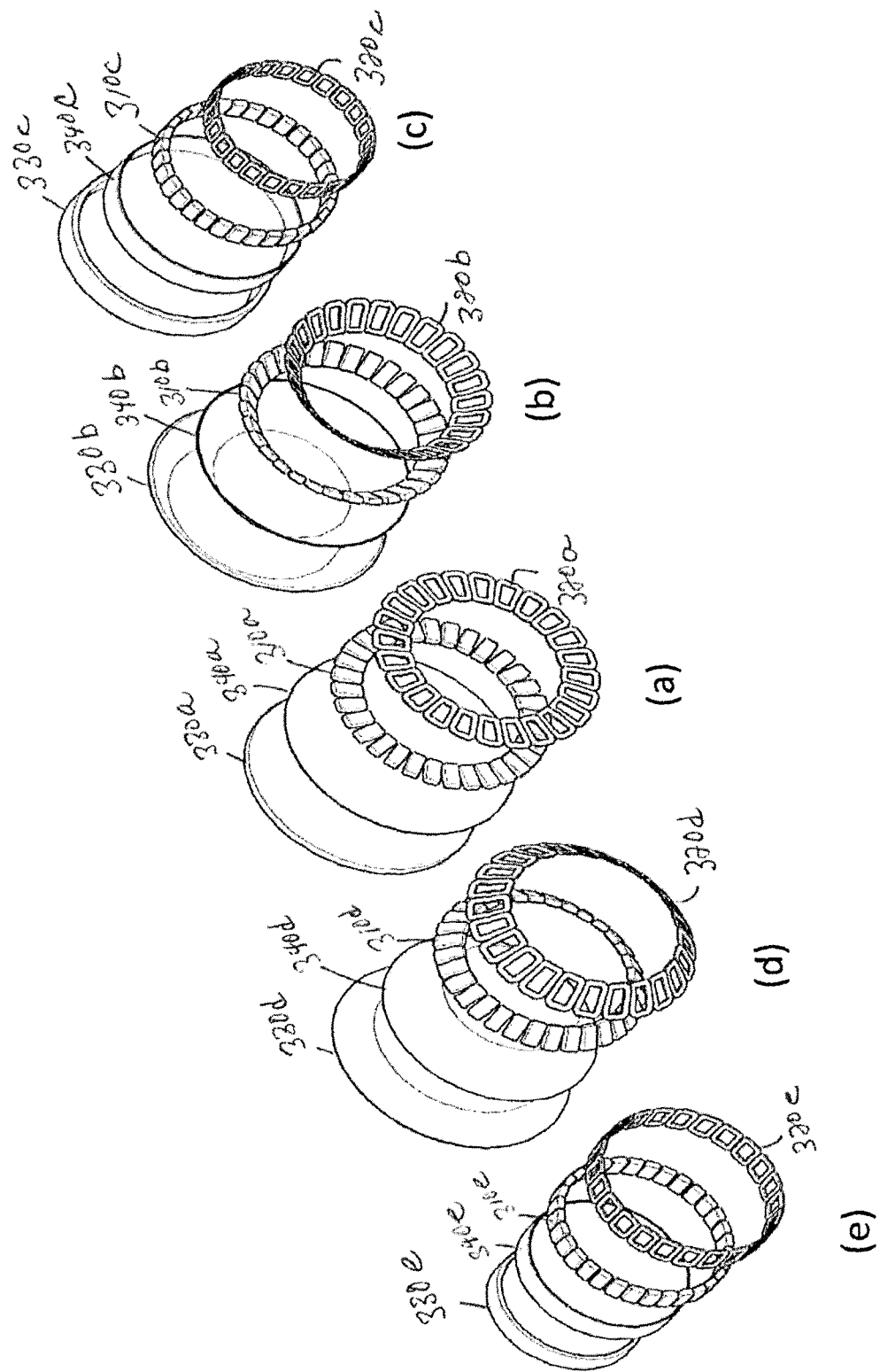
FIGS. 13a to 13e are exploded views of the variants of FIGS. 11a to 11e, respectively.

FIG. 10 is an illustration of an application example of the electric apparatus of FIG. 9, shown coupled to two vertical axis Darrieus turbines. In a turbo-generator application, two turbines 110A and 110B are respectively coupled to the rotating shafts 32A and 32B of the electric apparatus 200, the electric apparatus 200 being used as an electric generator. Using this configuration, it is possible to have both turbines 110A and 110B untied mechanically and rotating in the same direction, but at different speed, both turbines 110A and 110B contributing to the movement of the rotors 10A and 10B. Speed slips may differ between the rotor 10A and the rotor 30B on one hand, and between the rotor 10B and the rotor 30B on the other hand, but both sides contribute to bringing power to the generator as long as both turbines rotate faster than the rotors 10A and 10B. In a variant, if it is detected that one of the turbines 110A or 110B is not contributing power to the generator, a corresponding gap 50A or 50B on the same side may be altered so that the non-contributing turbine is effectively decoupled from the electric apparatus, in order to avoid slowing down the generator The above description and Figures describe non-limiting configurations of the electric apparatus 100 in which the rotor 10, the stator 20 and the rotor 30 are planar. Other configurations of the electric apparatus 100 introduced in the foregoing description of FIG. 3a may be envisioned and are within the scope of the present disclosure. For example, FIGS. 11a to 11e schematically show variants of the electric apparatus 100 of FIG. 3a. FIGS. 12a to 12e are perspective views of the variants of FIGS. 11a to 11e, respectively. FIGS. 13a to 13e are exploded views of the variants of FIGS. 11a to 11e, respectively. Considering at once FIGS. 11a-e, 12a-e and 13a-e, various configurations 300a-e of an electric apparatus are illustrated.

Configuration 300a of the electric apparatus is similar to the electric apparatus 100 in that it comprises a rotor 330a, which is similar to the rotor 30 and comprises an electrically conductive disk, a rotor 310a, which is similar to the rotor 10 and comprises an array of magnet pairs of alternating polarities, and a stator 320a, which is similar to the stator 20 and comprises an array of coils in its periphery. An optional isolating disk 340a may be inserted between the rotor 330a and the rotor 310a. In the configuration 300a, the rotor 330a, the isolating disk 340a, the rotor 310a and the stator 320a are all planar. The configuration 300a comprises an active region 350a. The active region 350a in turn comprises the array of magnets and the array of coils within which eddy current loops and magnetic fields are induced.

Configurations 300b-300e of the electric apparatus show that rotors 330b-e, isolating disks 340b-e, rotors 310b-e and stators 320b-e may all adopt non-planar shapes, in which active regions 350b-350e are positioned at various non-perpendicular angles relative to an axis of rotation 360 of the rotating shaft 32 (shown on earlier Figures), by angling of the rotors 330b-e, isolating disks 340b-e, rotors 310b-e and stators 320b-e near their periphery. Electric apparatuses built according to the configurations 300b-300e operate similarly to those built according to the configuration 300a and to the electric apparatus 100 of earlier Figures. Other configurations may also be envisioned. Those of ordinary skill in the art having the benefit of the present disclosure will be able to select a particular configuration according, for example, to the needs to locate the electric apparatus within a confined space.

Figure 14:
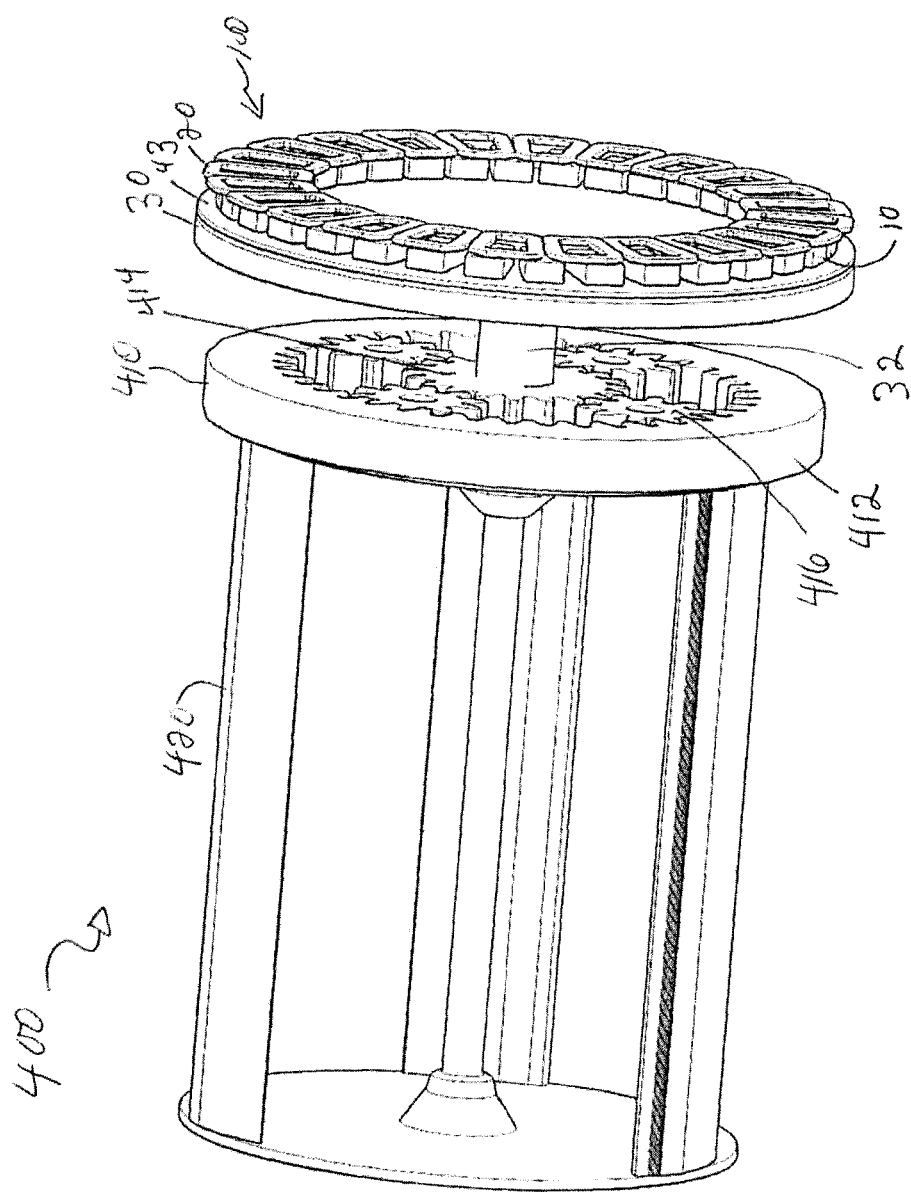
FIG. 14 is a perspective view of a turbine assembly comprising the electric apparatus of FIG. 3a mounted to a turbine via a planetary gear set.
Figure 15:
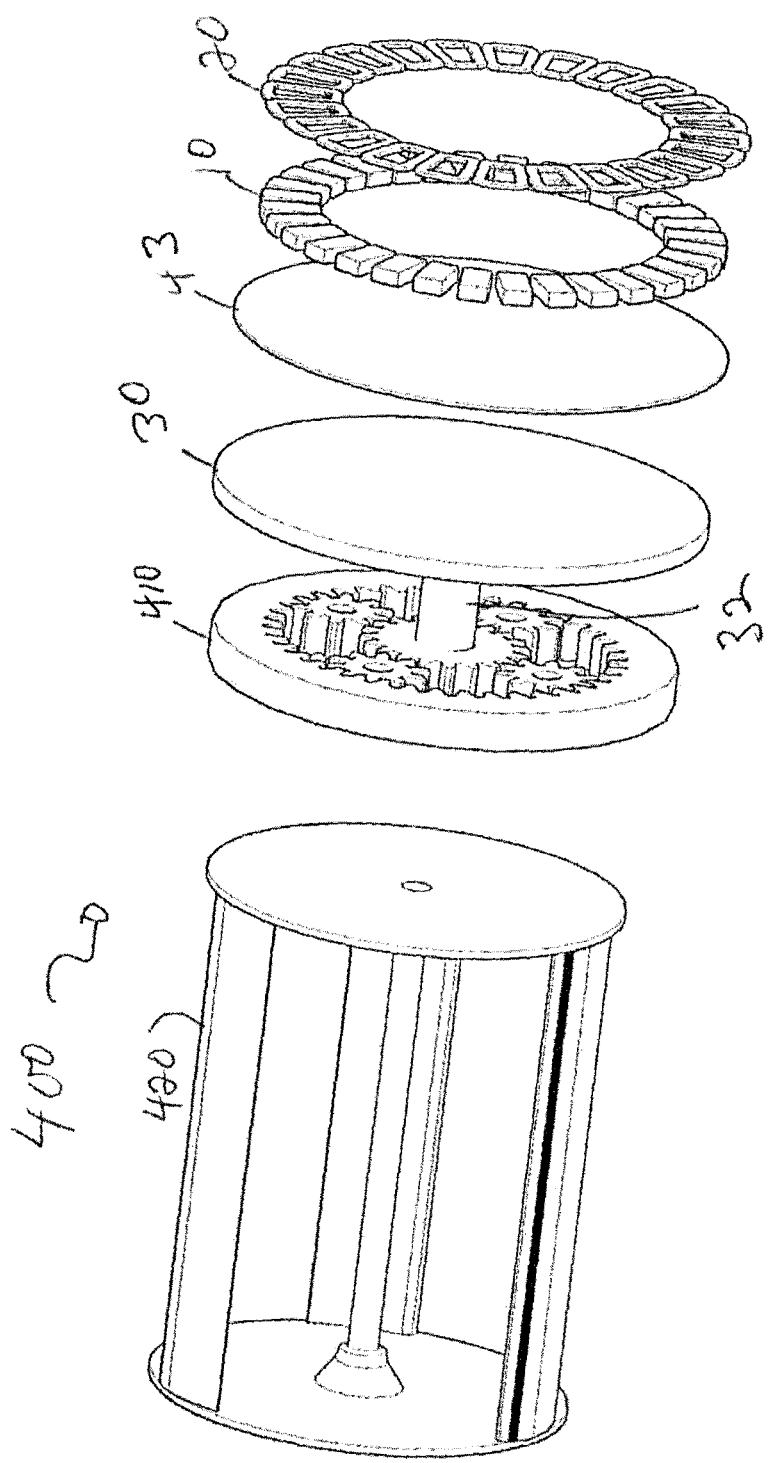
FIG. 15 is an exploded view of the turbine assembly of FIG. 14.

As expressed in the description of earlier Figures, for example as shown on FIGS. 5, 6a-c, 8 and 10, the electric apparatuses 100 and 200 may be connected directly via rotating shafts 32, 32A and/or 32B to a turbine such as 110, 110A, 110B, 120 or to a fan 130. FIG. 14 is a perspective view of a turbine assembly comprising the electric apparatus of FIG. 3a mounted to a turbine via a planetary gear set. FIG. 15 is an exploded view of the turbine assembly of FIG. 14. Referring at once to FIGS. 14 and 15, a turbine assembly comprises the electric apparatus 100, a turbine 420 and a gear drive such as, for example, a planetary gear set 410. An outer ring gear of 412 of the planetary gear set 410 is fixedly mounted to the turbine 420. A sun gear 414 of the planetary gear set 410 is attached to electric apparatus 100 via the rotating shaft 32. Planet gears 416 transfer movement between the sun gear 414 and the outer ring gear 412.

Addition of the planetary gear set 410 between the turbine 420 and the electric apparatus 100 ensure that the turbine 420 rotates at a lower rate than the electric apparatus 100 and multiplies a torque provided the electric apparatus 100 to the turbine 420.

Though not shown on the various Figures, yet another variant could use two planetary gear sets as shown on FIGS. 14 and 15 to couple the two turbines 110A and 110B of FIG. 10 to both sides of the electric apparatus 200.

Figure 16:
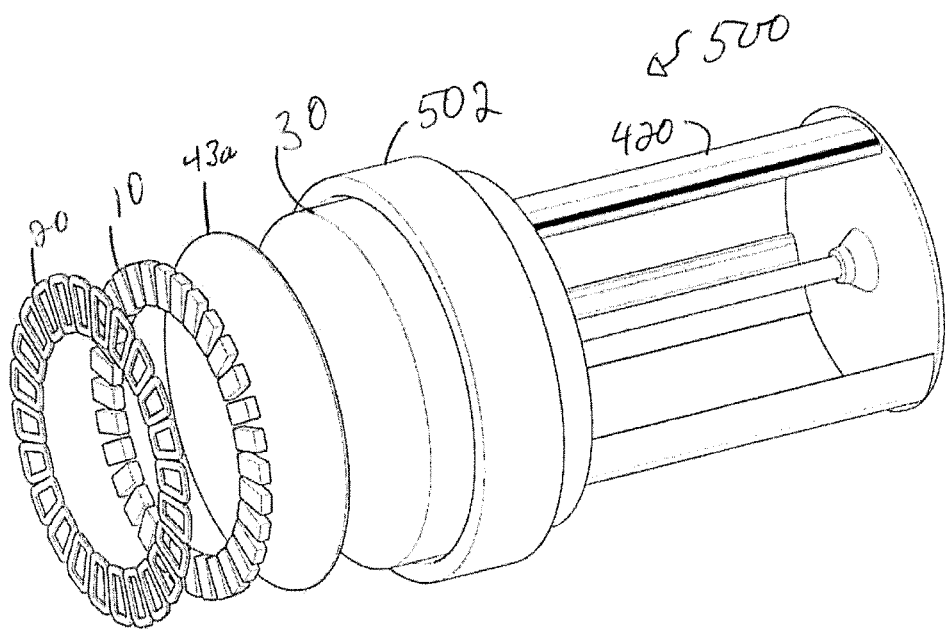
FIG. 16 is a perspective view of a variant of an electric apparatus using a different coupling mechanism.
Figure 17:
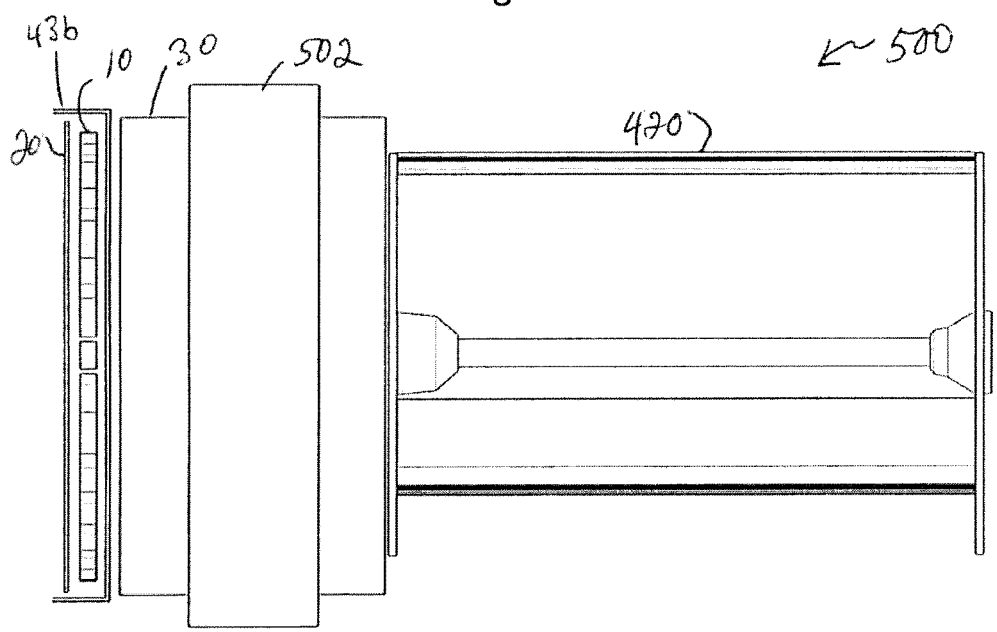
FIG. 17 is a side elevation view of the electric apparatus of FIG. 16.

In preceding Figures, one or two rotating shafts are used as coupling mechanisms for connecting the various electric apparatuses to other devices, such as to turbines. FIG. 16 is a perspective view of a variant of an electric apparatus using a different coupling mechanism. FIG. 17 is a side elevation view of the electric apparatus of FIG. 16. Considering at once FIGS. 16 and 17, an apparatus 500 comprises a turbine, for example the turbine 420 introduced hereinabove, as well as the stator 20, the rotor 10 and the rotor 30 as described in relation to the electric apparatus 100. An isolating disk 43a or an isolating enclosure 43b may also be present. The rotor 30 is connected to the turbine 420 via a bearing 502, which functions as a coupling mechanism for the electric apparatus. The rotor 30 may be coupled to the bearing 502 and the bearing 502 may be coupled to the turbine 420 using any well-known mechanical attachment device.

Though not shown on the various Figures, a further variant could use two bearings as shown on FIGS. 16 and 17 to couple the two turbines 110A and 110B of FIG. 10 to both sides of the electric apparatus 200.

Those of ordinary skill in the art will realize that the description of the electric apparatus are illustrative only and are not intended to be in any way limiting. Other embodiments will readily suggest themselves to such persons with ordinary skill in the art having the benefit of the present disclosure. Furthermore, the disclosed electric apparatus may be customized to offer valuable solutions to existing needs and problems of electric motors and generators.

In the interest of clarity, not all of the routine features of the implementations of the electric apparatus are shown and described. It will, of course, be appreciated that in the development of any such actual implementation of the electric apparatus, numerous implementation-specific decisions may need to be made in order to achieve the developer's specific goals, such as compliance with application-, system-, and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of electric motors and generators having the benefit of the present disclosure.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. An electric apparatus, comprising:
   a stator disk comprising an array of coils, each coil being radially positioned along a periphery of the stator disk forming a planar stator disk;
   a first rotor disk comprising an array of magnet pairs radially positioned along a periphery of the first rotor disk forming a first planar rotor disk, the first rotor disk having a first face adjacent to the stator disk, the first rotor disk being mounted on a first shaft; and
   a second rotor disk comprising conductive material, the second rotor disk being adjacent to a second face of the first rotor disk forming a second planar rotor disk, the second rotor disk being mounted on a second shaft;
   wherein a rotational speed difference between the first and second rotor disks generates eddy currents in the second rotor disk, whereby a torque is transmitted between the first and second rotor disks.

2. The electric apparatus of claim 1, wherein the torque is transmitted from one of the first and second rotor disks, rotating at a higher speed, to the other one of the first and second rotor disks.

3. The electric apparatus of claim 1, comprising:
   an enclosure containing the first rotor disk and the stator disk, the enclosure being sealed; and
   the second rotor disk being located outside of the enclosure.

4. The electric apparatus of claim 3, comprising:
   a turbine operably connected to the second shaft and capable of rotating under a flow of air or water; and
   an electric output connected to the array of coils of the stator disk for supplying current induced by rotation of the turbine to an electric load; wherein the turbine comprises a gear drive connecting the second shaft to the turbine, and the gear drive comprises a planetary gear set.

5. The electric apparatus of claim 1, comprising:
   an electric input connected to the array of coils for receiving power from an external source;
   wherein application of a current in the array of coils of the stator disk creates a mechanical force for transmission to a mechanical load operably connected to the second rotor.

6. The electric apparatus of claim 1, wherein:
   the stator disk, the first rotor disk and the second rotor disk a are positioned along a common axis.

7. The electric apparatus of claim 1, wherein:
   each magnet pair comprises two magnets having opposed polarities;
   the magnets of the magnet pairs are selected from the group consisting of ferromagnetic magnets, rare earth metal magnets, ceramic magnets, ferrite magnets, alnico magnets, neodym magnets, samarium magnets, composite magnets, electromagnets and combinations thereof; and
   the array of coils is electrically connected to an electric input/output.

8. The electric apparatus of claim 1, comprising:
   a third rotor disk comprising an array of magnet pairs radially positioned along a periphery of the third rotor disk, the third rotor disk having a first face adjacent to the stator disk;
   a fourth rotor disk comprising conductive material and being adjacent to a second face of the third rotor disk; and
   a third shaft coaxial with and fixedly connected to the fourth rotor disk.

9. The electric apparatus of claim 8, comprising:
   a first turbine operably connected to one of the rotating shafts and capable of rotating under a flow of air or water;
   a second turbine operably connected to another one of the rotating shafts and capable of rotating under a flow of air or water; and
   an external electric output connected to the stator for supplying current to an electric load.

10. The electric apparatus of claim 1, wherein an active region of the electric apparatus, comprising the array of coils and the array of magnet pairs, is positioned at a non-perpendicular angle relative to an axis of the first and second rotors.

11. A submersible electric generator, comprising:
a stator disk comprising an array of coils, each coil being radially positioned along a periphery of the stator disk to form a planar stator disk;
an electric output connected to the array of coils;
a first rotor disk comprising an array of magnet pairs radially positioned along a periphery of the first rotor disk to form a first planar rotor disk, the first rotor disk having a first face adjacent to a face of the stator disk, the first rotor disk being mounted on a first shaft;
a second rotor disk comprising conductive material, the second rotor disk being planar, the second rotor disk being adjacent to a second face of the first rotor disk, the second rotor disk being mounted on a second shaft through a coupling mechanism;
and
a turbine for driving the coupling mechanism;
wherein rotation of the turbine creates a rotational speed difference between the first and second rotor disks, generating eddy currents in the second rotor disk, creating a torque transmitted from the second rotor disk to the first rotor disk, a rotation of the first rotor disk generating a current in the array of coils for supplying the current to an electric load.

12. The submersible electric generator of claim 11, comprising:
a sealed enclosure containing the first rotor and the stator disk;
a sealing joint positioned on the sealed enclosure at a point where the first shaft protrudes from the sealed enclosure; and
a water barrier positioned between the first and second rotor disks.

13. The submersible electric generator of claim 11, wherein the turbine is a hydrokinetic turbine.

14. The submersible electric generator of claim 11, wherein an active region comprising the array of coils and the array of magnet pairs is positioned at a non-perpendicular angle relative to an axis of the first and second rotor disks.

15. The submersible electric generator of claim 11, wherein the coupling mechanism comprises a gear drive.

16. The submersible electric generator of claim 15, wherein the gear drive comprises a planetary gear set.

* * * * *